United States Patent [19]

Olson et al.

[11] Patent Number: 4,859,436

[45] Date of Patent: Aug. 22, 1989

[54] H2S REMOVAL PROCESS AND COMPOSITION

[75] Inventors: Donald C. Olson, Houston, Tex.; John J. Miller, deceased, late of Houston, Tex., by Wayne R. Miller, executor

[73] Assignee: Shell Oil Company, Houston, Tex.

[21] Appl. No.: 75,195

[22] Filed: Jul. 16, 1987

Related U.S. Application Data

[63] Continuation of Ser. No. 769,196, Aug. 23, 1985.

[51] Int. Cl.$^4$ ............... C01B 17/16; C01B 31/20; C01B 17/02
[52] U.S. Cl. ............................. 423/221; 423/226; 423/234; 423/576.6
[58] Field of Search ............... 423/573 R, 226, 221, 423/224, 234, 576.6

[56] References Cited

U.S. PATENT DOCUMENTS

| | | | |
|---|---|---|---|
| 3,068,065 | 10/1962 | Hartley et al. | 23/2 |
| 3,077,488 | 2/1963 | Mercier et al. | 260/439 |
| 3,622,273 | 11/1971 | Roberts et al. | 23/225 R |
| 3,676,356 | 7/1972 | Roberts et al. | 252/192 |
| 3,933,993 | 1/1976 | Salemme | 423/573 |
| 4,009,251 | 2/1977 | Meuly | 423/573 G |
| 4,011,304 | 3/1977 | Mancini et al. | 423/573 G |
| 4,036,942 | 7/1977 | Sibeud et al. | 423/573 |
| 4,189,462 | 2/1980 | Thompson | 423/573 G |
| 4,235,852 | 11/1980 | Nomoto et al. | 423/431 |
| 4,278,646 | 7/1981 | Lynn et al. | 423/226 |
| 4,288,421 | 9/1981 | Kudo et al. | 423/242 A |
| 4,330,522 | 5/1982 | Lieder | 423/573 G |
| 4,332,781 | 6/1982 | Lieder et al. | 423/224 |
| 4,356,155 | 10/1982 | Blytas et al. | 423/226 |
| 4,359,450 | 11/1982 | Blytas et al. | 423/226 |
| 4,364,871 | 12/1982 | Svatek et al. | 260/439 R |
| 4,368,178 | 1/1983 | Diaz | 423/226 |
| 4,382,918 | 5/1983 | Diaz | 423/226 |
| 4,400,368 | 8/1985 | Diaz | 423/573 R |
| 4,401,642 | 8/1983 | Blytas et al. | 423/573 G |
| 4,421,733 | 12/1983 | Blytas | 423/573 R |
| 4,431,616 | 2/1984 | Chou | 423/226 |
| 4,443,418 | 4/1984 | Lutz | 423/226 |
| 4,515,764 | 5/1985 | Diaz | 423/224 |
| 4,517,170 | 5/1985 | Klecka | 423/224 |
| 4,518,576 | 5/1985 | Diaz | 423/224 |
| 4,526,773 | 7/1985 | Weber | 423/224 |
| 4,532,118 | 7/1985 | Tajiri et al. | 423/573 R |
| 4,622,212 | 11/1986 | McManus et al. | 423/226 |

FOREIGN PATENT DOCUMENTS

| | | |
|---|---|---|
| 832323 | 2/1976 | Belgium . |
| 6501178 | 7/1965 | Netherlands . |
| 999800 | 3/1965 | United Kingdom . |
| 999799 | 7/1965 | United Kingdom . |

OTHER PUBLICATIONS

Chemical Abstracts, vol. 73, 38295v, Removing Hydrogen Sulfide from Gases Containing Oxygen, Matys et al.
Levenspiel, Chemical Reaction Engineering, pp. 99–118 (May, 1967).
Derwent Publication 68536-RD211031 Priority, Oct. 20, 1981, published 11-10-81.

Primary Examiner—John Doll
Assistant Examiner—Lori S. Freeman
Attorney, Agent, or Firm—Albert J. Adamcik

[57] ABSTRACT

A process for removal of H2S from gas streams is described, the process being characterized by use of a novel iron chelate treating solution containing a specified ferric to ferrous chelate ratio and aqueous ammonia.

29 Claims, 1 Drawing Sheet

$H_2S$ REMOVAL PROCESS AND COMPOSITION

This is a continuation of application Ser. No. 769,196, filed 8/23/85, now abandoned.

BACKGROUND OF THE INVENTION

The presence of significant quantities of $H_2S$ in various "sour" industrial gaseous streams poses a persistent problem. Although various procedures have been developed to remove and recover this contaminant, most such processes are deficient, for a variety of reasons.

In one cyclic method currently attracting attention, the sour gas is contacted with an aqueous polyvalent metal chelate or complex reactant system to produce solid sulfur which is recovered either prior to or subsequent to regeneration of the reactant. Preferred reactants are iron (III) complexes in which the iron (III) forms complexes with specified organic acids and derivatives thereof.

One of the disadvantages of such systems heretofore has been the inability to maintain sufficiently high concentrations of the chelate or complex to achieve efficient operation. Without sufficiently high levels of the complex, these processes are limited to their ability to handle streams containing significant quantities of $H_2S$. Again, the circulation of large volumes of dilute solutions to handle even moderate levels of $H_2S$ involves significant capital and energy costs, especially in high pressure applications. The invention addresses these problems, and provides a novel composition and process for the resolution thereof.

SUMMARY OF THE INVENTION

Accordingly, the invention relates to a process for removing $H_2S$ from $H_2S$ containing or sour gaseous streams, of the type described, in which ammonium chelate, aqueous ammonia-containing solution is provided for oxidation of the $H_2S$. The ammonium ferrous chelate produced has a higher solubility, and more concentrated solutions may be employed. It is an additional aspect of the invention that sodium or potassium ions are to be excluded from the solution employed, at least to the extent that the solubility limits of the sodium or potassium salts of the ferrous nitrilotriacetic acid chelate is exceeded. To this end, it is a further feature of the invention that pH adjustment, which is necessary from time to time, is made by the addition to the solution of ammonium hydroxide or carbonate. The invention also provides a solution that contains a high total iron content that is stable to precipitation, and that contains a specified range of ratios of ammonium ferric iron chelate to ammonium ferrous iron chelate. It has been determined that maintenance of a relatively high ferrous chelate concentration in the system, as described herein, particularly during regeneration, inhibits ligand degradation. The solution may be regenerated by contacting the aqueous admixture with oxygen under conditions to convert ammonium ferrous nitrilotriacetate chelate to ammonium ferric nitrilotriacetate chelate, producing regenerated aqueous reactant solution having a ratio of ammonium ferric nitrilotriacetate chelate to ammonium ferrous nitrilotriacetate chelate of from about 0.5 to about 6. To prevent sulfur build up, sulfur is removed or recovered at a suitable location in the system. Preferably, the sulfur is removed from at least the bulk of the admixture after removal of admixture from the contacting zone, but other suitable sites or loci, including slip streams from locations in the process, e.g., from the contactor, may be utilized. The sulfur may also be removed in a separate step after regeneration.

In a preferred form, the invention comprises a process for the removal of $H_2S$ from a sour gaseous stream comprising (a) contacting the sour gaseous stream with an aqueous reactant solution in a contacting zone at a temperature below the melting point of sulfur, the reactant solution comprising or containing ammonium ferric nitrilotriacetate chelate, ammonium ferrous nitrilotriacetate chelate, aqueous ammonia, and having a pH of about 5 to about 8.5, the ratio of the ammonium ferric nitrilotriacetate chelate to ammonium ferrous nitrilotriacetate chelate being from about 0.2 to about 6, under conditions to convert $H_2S$, producing a gaseous stream having reduced $H_2S$ content, and an aqueous admixture containing solid sulfur and additional ammonium ferrous nitrilotriacetate chelate in solution;

(b) removing aqueous admixture from the contacting zone and removing sulfur from at least a portion of said admixture;

(c) regenerating aqueous admixture by contacting said aqueous admixture with oxygen in a regeneration zone under conditions to convert ammonium ferrous nitrilotriacetate chelate to ammonium ferric nitrilotriacetate chelate, and producing regenerated solution having a ratio of ammonium ferric nitrilotriacetate chelate to ammonium ferrous nitrilotriacetate of from about 0.5 to about 6;

(d) passing regenerated aqueous reactant solution to the contacting zone for use as aqueous solution therein.

In another embodiment, the invention relates to a process for the removal of $H_2S$ from a sour gaseous stream comprising (a) contacting the sour gaseous stream with the aqueous reactant solution in a contacting zone at a temperature below the melting point of sulfur, the reactant solution comprising or containing ammonium ferric nitrilotriacetate chelate, ammonium ferrous nitrilotriacetate chelate, aqueous ammonia, and having a pH of from about 5 to about 8.5, the ratio of the ammonium ferric nitrilotriacetate chelate to ammonium ferrous nitrilotriacetate chelate being from about 0.2 to about 6, under conditions to convert $H_2S$, producing a sweet gaseous stream having reduced $H_2S$ content, and aqueous admixture containing solid sulfur and additional ammonium ferrous nitrilotriacetate chelate in solution;

(b) removing aqueous admixture from the contacting zone and regenerating aqueous admixture by contacting said aqueous admixture with oxygen in a regeneration zone under conditions to convert ammonium ferrous nitrilotriacetate chelate to ammonium ferric nitrilotriacetate chelate, and producing regenerated aqueous reactant solution containing sulfur and having a ratio of ammonium ferric nitrilotriacetate chelate to ammonium ferrous nitrilotriacetate chelate of from about 0.5 to about 6;

(c) removing regenerated aqueous reactant solution from the regeneration zone and removing sulfur from at least a portion of the regenerated solution; and (d) passing regenerated reactant solution to the contacting zone for use as aqueous reactant solution therein.

As indicated, the invention further includes an aqueous solution comprising ammonium ferric nitrilotriacetate chelate and ammonium ferrous nitrilotriacetate chelate, the ratio of ammonium ferric nitrilotriacetate chelate to ammonium ferrous nitrilotriacetate chelate being from about 0.2 to about 6. The solution may be synthesized, as described further herein, or may be produced with the ferric-ferrous ratios specified, in the operations of the process of the invention. The total iron concentration in the solution, as the chelates, based on the total amount of iron supplied originally, will range from about 0.5%, preferably about 1% to about 7% by weight, based on the weight of the solution and iron. In a solution that has been used in the removal of $H_2S$ from a gaseous stream, the total concentration of iron is not revealed by the sum of the concentrations of the ammonium ferric nitrilotriacetate chelate and the ammonium ferrous nitrilotriacetate chelate, since other iron complex or chelate species are present. It has been determined, for example, that some degradation products of the chelates employed (and degradation products thereof) are soluble iron chelates. Again, there is evidence, for example, that the ammonium ferric nitrilotriacetate chelate may be present as a dimer. As used herein, the term "ammonium ferrous nitrilotriacetate chelate" refers to those solubilized species, which, upon precipitation, are believed to have the formula $[NH_4][(NTA)Fe(H_2O)_2]$ where NTA refers to nitrilotriacetate. Because of the complexity of the system, however, and the difficulty of analysis of the components, the term may also be considered as simply defining the species in the solution in which ammonium ion and ferrous nitrilotriacetate chelate are chemically associated or related, whatever the precise nature or character of the relationship or bonding. The term "ammonium ferric nitrilotriacetate chelate" refers, correspondingly, to the ferric species in the solution. The maximum solubility limit of the ammonium ferrous nitrilotriacetate chelate is about 0.5M in unused solution.

As noted, the solutions employed will contain aqueous ammonia. As used herein, the term "aqueous ammonia" is understood to include dissolved ammonia, ammonium hydroxide, and ammonium ion, as understood from *Advanced Inorganic Chemistry*, 3rd edition; F. A. Cotton and G. Wilkinson, especially page 349. The aqueous ammonia is present in addition to the ammonium ion associated with or combined with the ferric nitrilotriacetate and ferrous nitrilotriacetate chelates. The quantity will vary, but will be at least about 0.1 percent, on a molar basis, with respect to the total quantity of the ammonium ferric and ammonium ferrous chelates used. Preferably, the aqueous ammonia will be present from, for example, 0.1 percent, to 200 or 300 percent, or more, on a molar basis, with respect to the quantity of the ammonium ferric and ammonium ferrous nitrilotriacetate chelates present. In practice, this quantity may be achieved by adjusting the pH of the solution with ammonium hydroxide or carbonate to the levels described hereinafter. Ammonium compounds having salt forming anions, with the carbonate exception, are not desirable.

The presence of significant concentrations of sodium or potassium ions is not desired in the solutions of the invention. The sodium and potassium salts of the ferrous chelate of nitrilotriacetic acid have been determined to have undesirably low solubilities, so that they are unsuitable for high concentration operations. By avoiding these materials, the invention provides efficiencies not attainable with prior art processes. For example, since concentrations of the complexes of the invention are higher, streams having greater concentrations of $H_2S$ may be treated, at similar throughput. Pumping costs are reduced, and vessel sizes, other factors being equal, may be reduced. As noted, some sodium or potassium ions are tolerable, provided that they are not present in sufficient amount to exceed the solubility of sodium or potassium ferrous nitrilotriacetate chelate. In this regard, minor quantities of sodium or potassium containing additives or buffers may be present.

For this reason, pH adjustment in the process of the invention is accomplished by the use of ammonium hydroxide or carbonate. Prior art practice of utilization of sodium hydroxide, potassium hydroxide, or sodium or potassium carbonates, is generally unsuited to the invention. The pH in the contacting zone will preferably be maintained in a range of from about 5 to 8.5, preferably 6.5 to 8.5, and in the regenerator, from about 7 to 8.5.

As noted, the regeneration of the reactant is accomplished by the utilization of oxygen, preferably as air. The oxygen will accomplish two functions, the oxidation of ferrous iron of the reactant to the ferric state, and the stripping of any dissolved gas from the admixture. The oxygen (in whatever form supplied) is supplied in a stoichiometric equivalent or excess with respect to the amount of ammonium ferrous nitrilotriacetic acid complex present in the mixture. Preferably, the oxygen is supplied in an amount of from about 20 percent to about 300 percent excess.

As used herein, the term "oxygen" is not limited to "pure" oxygen, but includes air, air-enriched with oxygen, or other oxygen-containing gases.

The particular type of sour gaseous stream treated is not critical, the only practical limitation being the reactivity of the stream itself with the solution employed, as will be evident to those skilled in the art. Streams particularly suited to removal of $H_2S$ by the practice of the invention are, as indicated, naturally-occurring gases, recycled $CO_2$ used in enhanced oil recovery, synthesis gases, process gases, and fuel gases produced by gasification procedures, e.g., gases produced by the gasification of coal, petroleum, shale, tar sands, etc. Particularly preferred are coal gasification streams, natural gas streams, produced and recycled $CO_2$ streams, and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing sigificant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.005 percent to about 10 percent by volume. $CO_2$ content will also vary, but may range from about 0.1 percent to about 99.0 percent (or more) by volume. In this context, the invention may be used to remove H₂S from various CO₂ streams, e.g., supercritical CO₂ streams.

The temperatures employed in the contacting or absorption-contact zone are not generally critical, except that the reaction is carried out below the melting point of sulfur. In many commercial applications, such as removal of H₂S from natural gas to meet pipeline specifications, absorption at ambient temperatures is desired, since the cost of refrigeration would exceed the benefits obtained due to increased absorption at the lower temperature. In general, temperatures of from 10° C. to 80° C. are suitable, and temperatures of from 20° C. to 60° C. are preferred. Total contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at substantially the same temperature, or somewhat lower, as the contacting zone. In general, temperatures of from about 10° C. to 80° C., preferably 20° C. to 50° C. may be employed.

Pressure conditions in the contacting zone may vary widely, depending on the pressure of the gas to be treated. For example, pressures in the contacting zone may vary from one atmosphere up to one hundred fifty or even two hundred atmospheres. Pressures of from one atmosphere to about one hundred atmospheres are preferred. In the regeneration zone, pressures may also be varied considerably, and will preferably range from about 1 atmosphere to about three or four atmospheres. Residence times for given volumes of admixture and oxygen will range from 10 minutes to 60 minutes, preferably from 20 minutes to 40 minutes. The pressure, fluid flow, and temperature relationships involved are well understood by those skilled in the art, and need not be detailed herein. Other conditions of operation for this type of reaction process are further described in U.S. Pat. No. 3,068,065 to Hartley et al, dated Dec. 11, 1962, incorporated herein by reference. Preferably, the molar ratio of the nitrilotriacetic acid to total iron is from about 1.0 to 1.5. The process is preferably conducted continuously.

As indicated, the H₂S, when contacted, is rapidly converted in the process of the invention by the ammonium ferric nitrilotriacetate chelate to solid elemental sulfur. The amount of ammonium ferric nitrilotriacetate supplied or employed in solution is an amount sufficient to reduce the H₂S concentration or content of the stream to the desired level. If total or substantially total removal is desired, the total amount supplied will generally be on the order of at least about two mols per mol of H₂S. Ratios of from about 2 mols to about 15 mols of ammonium ferric nitrilotriacetate chelate per mol of H₂S may be used, with ratios from about 2 mols per mol to about 5 mols of ammonium ferric chelate per mol of H₂S being preferred. As noted, the ratio of ammonium ferric nitrilotriacetate chelate to ammonium ferrous nitrilotriacetate chelate present in solution will normally be less than 6, and will normally range from about 0.2 to about 6, preferably about 0.5 to about 6.

The manner of preparing the solutions of the invention is, to some extent, a matter of choice. For example, the solutions employed in the process of the invention may be prepared by reaction of elemental iron with nitrilotriacetic acid, as described in U.S. Pat. No. 3,115,511, followed by air oxidation, pH adjustment with ammonium hydroxide, and appropriate water dilution to achieve the desired concentration. Alternately, nitrilotriacetic acid, ferrous carbonate, ammonium hydroxide and oxygen (air) may be reacted to prepare the solution. The novel compositions of the invention may be produced, for example, by separate reduction of one of the above mentioned solutions until the appropriate levels of the ammonium ferrous chelate are formed, or the solutions mentioned above may simply be employed in the process of the invention until the appropriate ratios of ferric to ferrous ligand are reached.

BRIEF DESCRIPTION OF THE DRAWINGS

In order to describe the invention in greater detail, reference is made to the accompanying schematic drawing.

FIG. 1 of the drawing illustrates the embodiment of the invention wherein sulfur removal is accomplished in a separate step prior to regeneration, while

Figure 1:
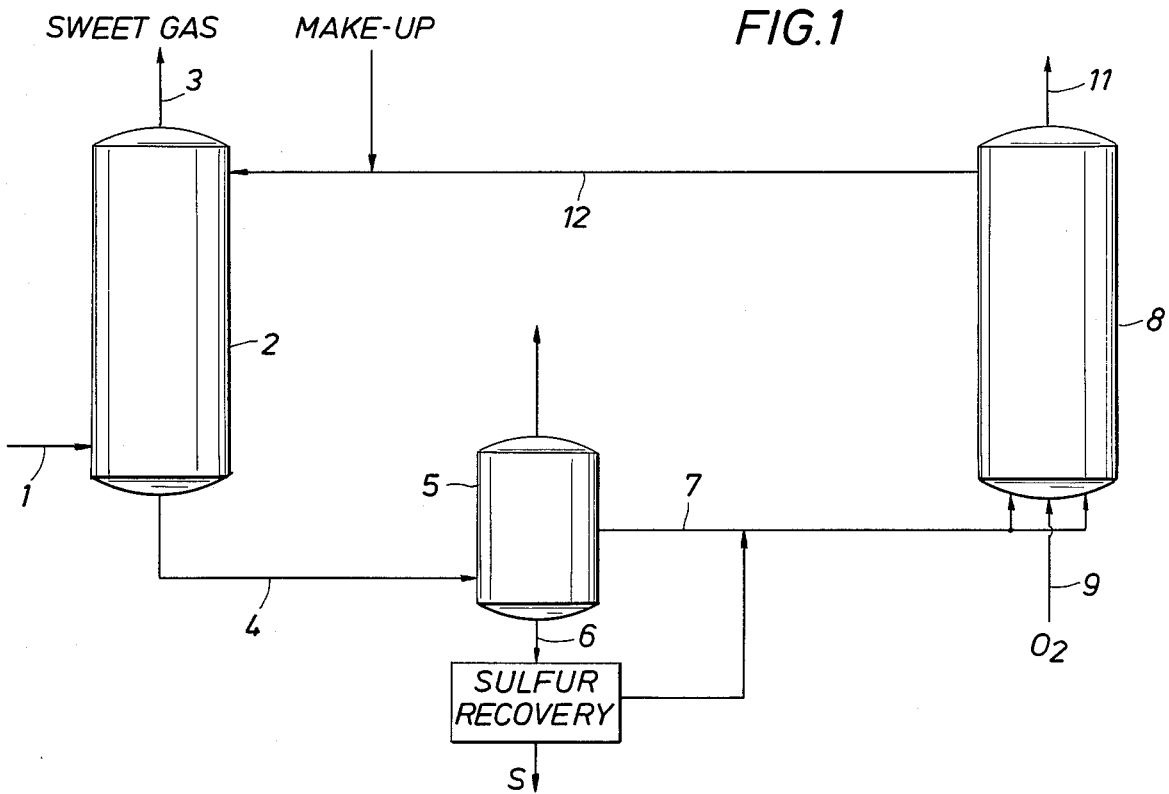

All values are calculated or merely exemplary, and all flows, unless stated otherwise, are continuous.

DETAILED DESCRIPTION OF THE INVENTION

As shown, sour gas, e.g., natural gas containing about 0.5 percent H₂S, in line (1) enters contactor or column (2) into which also enters an aqueous mixture comprising an aqueous 0.8M solution of ammonium ferric nitrilotriacetate chelate, which mixture also contains 0.2 moles per liter of the ammonium ferrous nitrilotriacetate chelate. The solution is produced by utilization of the reducing effect of the H₂S in the gaseous stream. That is, the initial solution in the contactor is a 1M aqueous solution of ferric nitrilotriacetate with a total concentration of ammonium ion and aqueous ammonia of 3 molar. After startup, and reaction with the H₂S in the gaseous stream, regeneration, described hereinafter, is controlled so that regeneration of the ammonium ferric nitrilotriacetic acid complex is not complete, in the ratios mentioned. Absorber or contactor (2) may be of any suitable type, such as a packed column or tray column, but is preferably a combination venturispray column system, as described in commonly assigned, copending application Ser. No. 769,199, entitled "Staged Removal of H₂S From Gas Streams", filed even date herewith, incorporated herein by reference. Depending on the size of the gas stream, the H₂S content, etc., more than one contactor unit may be employed, preferably in series. In any event, in the unit illustrated, the pressure of the feed gas is about 1200 p.s.i.g., and the temperature of the aqueous mixture is about 45° C. A contact time of about 120 seconds is employed in order to react all the H₂S. Purified or "sweet" gas leaves column (2) through line (3). The "sweet" gas is of a purity sufficient to meet standard requirements. In the mixture, the H₂S is converted to solid elemental sulfur by the ammonium ferric nitrilotriacetate chelate; ammonium ferric nitrilotriacetate chelate in the process being converted to ammonium ferrous nitrilotriacetate chelate. The aqueous admixture produced, containing elemental sulfur, is removed continuously, and sent through line (4) to a depressurization and degassing unit (5), which also serves as a sulfur concentration or thickening zone. A minor portion, e.g., 5 to 10 percent by volume of the admixture in thickener (5), and containing an increased sulfur concentration, is continuously withdrawn from the lower portion of settler or concentrator (5) and sent via line (6) to sulfur recovery.

Sulfur recovery may be accomplished in any suitable fashion, such as by filtration. Preferably, however, sulfur is recovered by that method described in commonly assigned, copending application Ser. No. 769,198, entitled Separation of Sulfur from Chelate Solutions, filed even date herewith, incorporated herein by reference. Solution recovered during sulfur recovery may be returned to any suitable point in the process, if proper adjustment is made, but is preferably sent, as shown, to the regeneration zone. The major portion of the aqueous admixture in vessel (5), having a reduced sulfur content, is removed via line (7) for regeneration of ammonium ferric nitrilotriacetate chelate. In regeneration zone or column (8), the admixture is contacted with excess air from line (9) to convert the ammonium ferrous nitrilotriacetate chelate to ammonium ferric nitrilotriacetate chelate.

Regeneration zone (8) comprises a sparged tower regenerator with cocurrent upflow of oxygen (as air), via line (9), and aqueous admixture. Air velocity in the regenerator is in the range of 0.1 to 3 feet per second. The temperature in the column is about 45° C., and overall pressure is about 2 atmospheres. Spent air is removed via line (11), and regenerated admixture, having a ratio of ammonium ferric nitrilotriacetate chelate to ammonium ferrous nitrilotriacetate chelate of about 4 is returned via line (12) to column 2.

Figure 2:
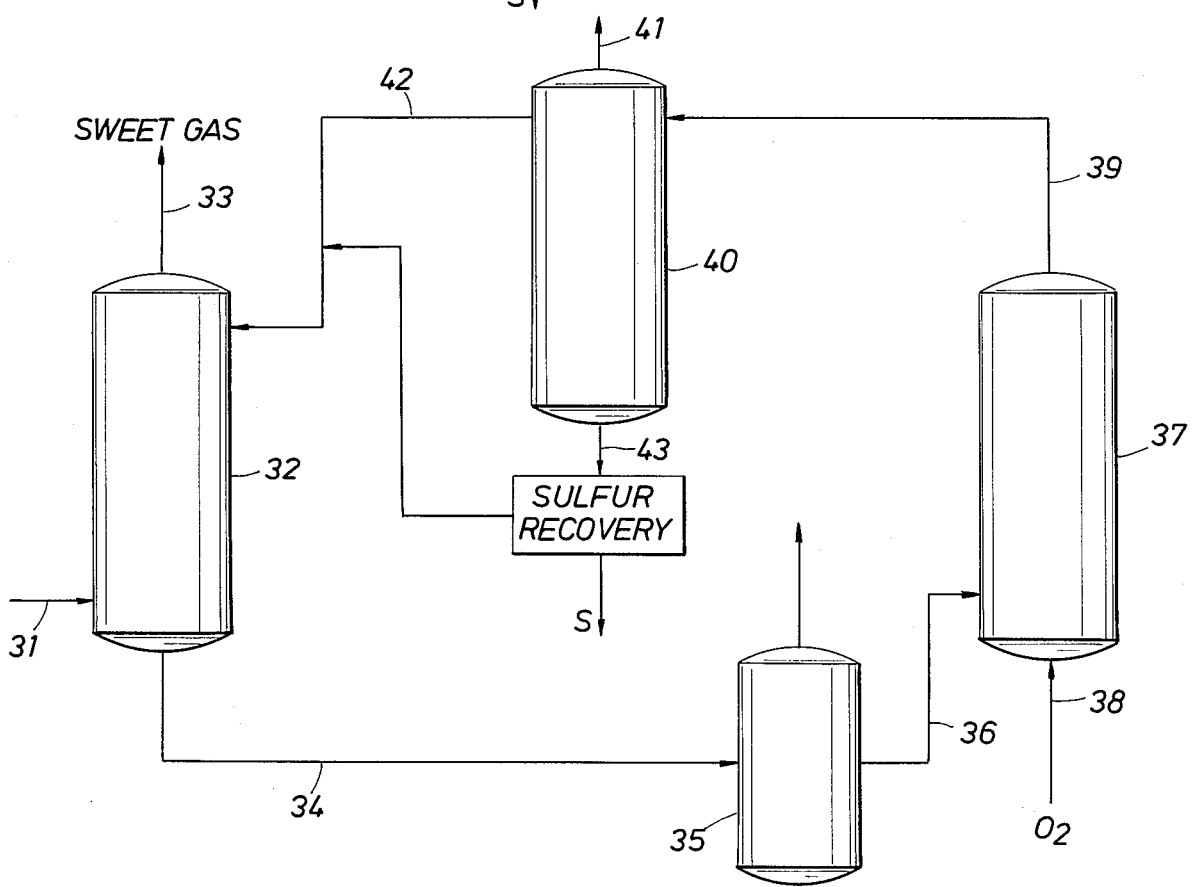
FIG. 2 illustrates the case where sulfur is removed in a separate step after regeneration.

In FIG. 2, sour gas e.g., natural gas containing about 0.5 percent $H_2S$, and 32 percent by volume $CO_2$, in line (31) enters column (32) (sparged column type) and contacts an aqueous 0.8M solution of ammonium ferric nitrilotriacetic chelate, also containing 0.2 moles per liter ammonium ferrous nitrilotriate chelate, the total concentration of ammonium ion and aqueous ammonia being 3 molar. The pressure of the feed gas is about 1200 p.s.i.g., and the temperature of the aqueous mixture is about 45° C. A contact time of about 45 seconds is employed in order to react all the $H_2S$. Purified or "sweet" gas leaves column (32) through line (33). The "sweet" gas is of a purity sufficient to meet standard requirements. In the aqueous mixture, the $H_2S$ is converted to elemental sulfur by the solubilized ferric chelate. The aqueous mixture, containing elemental sulfur, a slight amount of absorbed $CO_2$, and about 0.5 moles per liter solubilized ferrous chelate, is removed continuously and sent through line (34) to degassing. As shown, any dissolved gases are removed in unit (35) by reduction of pressure, and the admixture forwarded via line (36) to column (37).

In regeneration zone (37), admixture is treated in a similar fashion to that described with reference to FIG. 1. Ammonium ferrous nitrilotriacetate chelate is converted by oxygen (line 38) to the ammonium ferric chelate, while maintaining sufficient ammonium ferrous nitrilotriacetate chelate to inhibit degradation of the iron chelates. The temperature of the column (37) is about 45° C., and the pressure in the column is maintained at about 2 atmospheres. The regenerated admixture, which still contains elemental sulfur, and spent excess air is sent through line (39) to degassing and thickening zone (40). Spent air is removed from column (40) through line (41). From unit (40), which corresponds to concentrator or separator (5), major and minor portions of the regenerator, solid sulfur-containing admixture are separated, the major portion being sent through line (42) to the contactor (32). The minor portion, e.g., 5 percent by volume of the mixture in (40), and containing an increased sulfur content, is sent through line (43) to sulfur recovery in the manner described in relation to FIG. 1. Admixture from sulfur recovery is returned to the system via line (42).

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting zone may comprise two separate countercurrent columns in which the solution from the lower portion of the first column would be introduced into the upper portion of the second column, the partially purified gaseous material produced from the upper portion of the first column being fed into the lower portion of the second column. Parallel operation of units, is, of course, well within the scope of the invention. Admixture of solution withdrawal or introduction may be made at any suitable site(s) or loci in the particular zone. The return of solution to one or more multiple contacting units in the contacting zone from a regenerator, or the use of a common regenerator, is within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, other additives, such as antifoaming and/or wetting agents, may be employed.

What is claimed is:

1. A process for the removal of $H_2S$ from an $H_2S$-containing gaseous stream comprising contacting the $H_2S$-containing gaseous stream with aqueous reactant solution in a contacting zone, at a temperature below the melting point of sulfur, the reactant solution containing ammonium ferric nitrilotriacetate chelate and ammonium ferrous nitrilotriacetate chelate, the ratio of the ammonium ferric nitrilotriacetate chelate to ammonium ferrous nitrilotriacetate chelate in the reactant solution being from about 0.2 to about 6, at least about 0.1 percent, molar basis, with respect to said ammonium ferric and ammonium ferrous nitrilotriacetate chelates, of aqueous ammonia, a total iron content of from about 0.5 percent to about 7 percent by weight, based on the weight of the solution and iron, and a total concentration of sodium and potassium ions present in the reactant solution less than that sufficient to precipitate sodium and potassium ferrous nitrilotriacetate chelate, and having a pH of from about 5 to about 8.5, under conditions to convert $H_2S$, producing a gaseous stream having reduced $H_2S$ content and an aqueous admixture containing solid sulfur and additonal ammonium ferrous nitrilotriacetate chelate in solution.

2. The process of claim 1 wherein the aqueous admixture is regenerated for reuse by contacting said aqueous admixture with oxygen in a regeneration zone under conditions to convert ammonium ferrous nitrilotriacetate chelate to ammonium ferric nitrilotriacetate chelate, and producing regenerated aqueous reactant solution having a ratio of ammonium ferric nitrilotriacetate chelate to ammonium ferrous nitrilotriacetate of from about 0.5 to about 6; and the regenerated aqueous reactant solution is passed to the contacting zone for use as aqueous reactant solution therein.

3. The process of claim 2 wherein sulfur is removed at a locus in the process.

4. A process for the removal of $H_2S$ from a sour gaseous stream comprising (a) contacting the sour gaseous stream with aqueous reactant solution in a contacting zone at a temperature below the melting point of sulfur, the reactant solution containing ammonium ferric nitrilotriacetate chelate and ammonium ferrous nitrilotriacetate chelate, the ratio of the ammonium ferric nitrilotriacetate chelate to ammonium ferrous nitrilotriacetate chelate in the reactant solution being from about 0.2 to about 6, at least about 0.1 percent, molar basis, with respect to said ammonium ferric and ammonium ferrous nitrilotriacetate chelates, of aqueous ammonia, a total iron content of from about 0.5 percent to about 7 percent by weight, based on the weight of the solution and iron, and a total concentration of sodium and potassium ions present in the reactant solution less than that sufficient to precipitate sodium and potassium ferrous nitrilotriacetate chelate, and having a pH of from about 5 to about 8.5, under conditions to convert $H_2S$, producing a gaseous stream having reduced $H_2S$ content, and an aqueous admixture containing solid sulfur and additional ammonium ferrous nitrilotriacetate chelate in solution;

(b) regenerating aqueous admixture by contacting said aqueous admixture with oxygen under conditions to convert ammonium ferrous nitrilotriacetate chelate to ammonium ferric nitrilotriacetate chelate, and producing regenerated aqueous reactant solution having a ratio of ammonium ferric nitrilotriacetate chelate to ammonium ferrous chelate of from about 0.5 to about 6; and (c) passing the regenerated aqueous reactant solution to the contacting zone for use as aqueous reactant solution therein.

5. The process of claim 4 wherein sulfur is removed at a locus in the process.

6. A process for the removal of $H_2S$ from a sour gaseous stream comprising (a) contacting the sour gaseous stream with aqueous reactant solution in a contacting zone at a temperature below the melting point of sulfur, the reactant solution containing ammonium ferric nitrilotriacetate chelate and ammonium ferrous nitrilotriacetate chelate, the ratio of the ammonium ferric nitrilotriacetate chelate to ammonium ferrous nitrilotriacetate chelate in the reactant solution being from about 0.2 to about 6, at least about 0.1 percent, molar basis, with respect to said ammonium ferric and ammonium ferrous nitrilotriacetate chelates, of aqueous ammonia, a total iron content of from about 0.5 percent to about 7 percent by weight, based on the weight of the solution and iron, and a total concentration of sodium and potassium ions present in the reactant solution less than that sufficient to precipitate sodium and potassium ferrous nitrilotriacetate chelate, and having a pH of from about 5 to about 8.5, under conditions to convert $H_2S$, producing a gaseous stream having reduced $H_2S$ content, and an aqueous admixture containing solid sulfur and additional ammonium ferrous nitrilotriacetate chelate in solution;

(b) removing aqueous admixture from the contacting zone and removing sulfur from at least a portion of said admixture;

(c) regenerating aqueous admixture by contacting said aqueous admixture with oxygen in a regeneration zone under conditions to convert ammonium ferrous nitrilotriacetate chelate to ammonium ferric nitrilotriacetate chelate, and producing regenerated aqueous reactant solution having a ratio of ammonium ferric nitrilotriacetate chelate to ammonium ferrous nitrilotriacetate of from about 0.5 to about 6;

(d) passing regenerated aqueous reactant solution to the contacting zone for use as aqueous reactant solution therein.

7. A process for the removal of $H_2S$ from a sour gaseous stream comprising (a) contacting the sour gases stream with aqueous reactant solution in a contacting zone at a temperature below the melting point of sulfur, the reactant solution containing ammonium ferric nitrilotriacetate chelate and ammonium ferrous nitrilotriacetate chelate, the ratio of the ammonium ferric nitrilotriacetate chelate to ammonium ferrous nitrilotriacetate chelate in the reactant solution being from about 0.5 to about 6, at least about 0.1 percent, molar basis, with respect to said ammonium ferric and ammonium ferrous nitrilotriacetate chelates, of aqueous ammonia, a total iron content of from about 1.0 percent to about 7 percent by weight, based on the weight of the solution and iron, and a total concentration of sodium and potassium ions present in the reactant solution less than that sufficient to precipitate sodium or potassium ferrous nitrilotriacetate chelate, and having a pH of from about 5 to about 8.5, under conditions to convert $H_2S$, producing a gaseous stream having reduced $H_2S$ content, and aqueous admixture containing solid sulfer and additional ammonium ferrous nitrilotriacetate chelate in solution;

(b) removing aqueous admixture from the contacting zone and removing sulfur from at least a portion of said admixture, producing an aqueous admixture having a reduced sulfur content;

(c) regenerating aqueous admixture having a reduced sulfur content from step (b) by contacting said aqueous admixture with oxygen in a regeneration zone under conditions to convert ammonium ferrous nitrilotriacetate chelate to ammonium ferric nitrilotriacetate chelate, and producing regenerated aqueous reactant solution having a ratio of ammonium ferric nitrilotriacetate chelate to ammonium ferrous nitrilotriacetate of from about 0.5 to about 6;

(d) passing regenerated aqueous reactant solution to the contacting zone for use as aqueous reactant solution therein.

8. The process of claim 7 wherein the stream from which the $H_2S$ is removed is selected from naturally occurring gases, synthesis gases, process gases, and fuel gases.

9. The process of claim 7 wherein the sour gaseous stream is natural gas, a stream derived from the gasification of coal or a liquid hydrocarbon, or a stream comprising $CO_2$.

10. A process for the removal of $H_2S$ from a sour gaseous stream employing an aqueous reactant solution containing degradable iron chelates comprising
  (a) contacting the sour gaseous stream with aqueous reactant solution in a contacting zone at a temperature below the melting point of sulfur, the reactant solution containing ammonium ferric nitrilotriacetate chelate and ammonium ferrous nitrilotriacetate chelate, the ratio of the ammonium ferric nitrilotriacetate chelate to ammonium ferrous nitrilotriacetate chelate in the reactant solution being from about 0.5 to about 6, at least about 0.1 percent, molar basis, with respect to said ammonium ferric and ammonium ferrous nitrilotriacetate chelates, of aqueous ammonia, a total iron content of from about 1.0 percent to about 7 percent by weight, based on the weight of the solution and iron, and a total concentration of sodium and potassium ions present in the reactant solution less than that sufficient to precipitate sodium or potassium ferrous nitrilotriacetate chelate, and having a pH of from about 5 to about 8.5, under conditions to convert $H_2S$, producing a gaseous stream having a reduced $H_2S$ content, and an aqueous admixture containing solid sulfur and an increased concentration of ferrous nitrilotriacetate chelate in solution;
  (b) removing aqueous admixture from the contacting zone and regenerating aqueous admixture by contacting admixture to be regenerated with oxygen in a regeneration zone under conditions to convert ferrous nitrilotriacetate chelate in the admixture to ferric nitrilotriacetate chelate, and producing regenerated aqueous reactant solution containing sulfur and having a ratio of ferric nitrilotriacetate chelate to ferrous nitrilotriacetate chelate of from 0.5 to 6;
  (c) removing regenerated aqueous reactant solution from the regeneration zone, and removing sulfur from at least a portion of said admixture, producing a regenerated reactant solution having reduced sulfur content;
  (d) passing regenerated reactant solution having reduced sulfur content from step (c) to the contacting zone for use as aqueous reactant solution therein.

11. The process of claim 4 wherein the stream from which the $H_2S$ is removed is selected from naturally occurring gases, synthesis gases, process gases, and fuel gases.

12. The process of claim 6 wherein ammonium hydroxide or ammonium carbonate is added to maintain pH in the contacting zone in a range of from 5 to 8.5.

13. The process of claim 10 wherein ammonium hydroxide or ammonium carbonate is added to maintain pH in the contacting zone in a range of from 5 to 8.5.

14. The process of claim 4 wherein the pH is maintained from 6 to 8.5.

15. The process of claim 10 wherein the pH is maintained from 6 to 8.5.

16. In a process for the removal of $H_2S$ from an $H_2S$-containing gaseous stream by contacting the $H_2S$-containing gaseous stream with an aqueous reactant solution containing ferric nitrilotriacetate chelate and ferrous nitrilotriacetate chelate, whereby $H_2S$ is oxidized to elemental sulfur and a portion of the ferric nitrilotriacetate chelate is reduced to ferrous nitriloacetate chelate, the improvement which comprises
  utilizing an aqueous reactant solution having a pH of from about 5 to about 8.5 and containing (1) ammonium ferric nitrilotriacetate chelate and ammonium ferrous nitrilotriacetate chelate in a ratio of from about 0.2 to about 6, the total iron content of the aqueous reactant solution being from about 0.5 percent to about 7 percent by weight, based on the weight of the iron and the solution; and (2) at least about 0.1 percent, molar basis, with respect to said ammonium ferric and ammonium ferrous nitrilotriacetate chelates, of aqueous ammonia, the concentration of sodium and potassium ions present in the aqueous reactant solution being less than the sufficient to precipitate sodium or potassium ferrous nitrilotriacetate chelate.

17. The improved process of claim 16 wherein the ratio of ammonium ferric nitrilotriacetate chelate to ammonium ferrous nitrilotriacetate chelate is from about 0.5 to about 6.

18. The improved process of claim 17 wherein the total iron content of the aqueous reactant solution is from about 1 to about 7 percent by weight.

19. The improved process of claim 16 wherein the pH of the aqueous reaction solution is 6.5 to about 8.5.

20. The improved process of claim 19 wherein the ratio of ammonium ferric nitrilotriacetate chelate to ammonium ferrous nitrilotriacetate is from about 0.5 to about 6.

21. The improved process of claim 16 where the pH is maintained by the addition of ammonium hydroxide or ammonium carbonate.

22. The process of claim 17 wherein the pH is maintained by the addition of ammonium hydroxide or ammonium carbonate.

23. The process of claim 18 wherein the pH is maintained by the addition of ammonium hydroxide or ammonium carbonate.

24. The process of claim 19 wherein the pH is maintained by the addition of ammonium hydroxide or ammonium carbonate.

25. The process of claim 20 wherein the pH is maintained by the addition of ammonium hydroxide or ammonium carbonate.

26. In a process for the removal of $H_2S$ from an $H_2S$-containing gaseous stream by contacting the $H_2S$-containing gaseous stream with an aqueous reactant solution containing ferric nitrilotriacetate chelate and ferrous nitrilotriacetate chelate, whereby $H_2S$ is oxidized to elemental sulfur and a portion of the ferric nitrilotriacetate chelate is reduced to ferrous nitrilotriacetate chelate, the improvement which comprises
  utilizing an aqueous reactant solution having a pH of from about 5 to about 8.5 and containing ammonium ferric nitrilotriacetate chelate and ammonium ferrous nitrilotriacetate chelate in a ratio of from about 0.2 to about 6, a total iron content of from about 0.5 percent to about 7 percent by weight, based on the weight of the solution and iron, and at least about 0.1 percent, molar basis, with respect to said ammonium ferric and ammonium ferrous nitrilotriacetate chelates, of aqueous ammonia, said reactant solution being at least substantially free from any precipitated sodium or potassium ferrous nitrilotriacetate chelate.

27. The improved process of claim 26, wherein the total iron content of the aqueous reactant solution is from about 1 to about 7 percent by weight.

28. The improved process of claim 27 wherein the pH of the aqueous reactant solution is from 6.5 to about 8.5.

29. The process of claim 26 wherein the pH is maintained while regenerating at from about 7 to about 8.5.

* * * * *